US012151130B2

(12) United States Patent
Johnson

(10) Patent No.: US 12,151,130 B2
(45) Date of Patent: Nov. 26, 2024

(54) REMOTE CONTROLLABLE SELECTOR VALVE CONFIGURATION

(71) Applicant: KIDDE-FENWAL, LLC, Ashland, MA (US)

(72) Inventor: Paul M. Johnson, Palm Beach Gardens, FL (US)

(73) Assignee: KIDDE-FENWAL, LLC, Ashland, MA (US)

( * ) Notice: Subject to any disclaimer, the term of this patent is extended or adjusted under 35 U.S.C. 154(b) by 968 days.

(21) Appl. No.: 16/972,876

(22) PCT Filed: Jun. 10, 2019

(86) PCT No.: PCT/US2019/036303
§ 371 (c)(1),
(2) Date: Dec. 7, 2020

(87) PCT Pub. No.: WO2020/005520
PCT Pub. Date: Jan. 2, 2020

(65) Prior Publication Data

US 2021/0322812 A1 Oct. 21, 2021

Related U.S. Application Data

(60) Provisional application No. 62/689,320, filed on Jun. 25, 2018.

(51) Int. Cl.
*A62C 37/46* (2006.01)
*A62C 35/68* (2006.01)

(52) U.S. Cl.
CPC .............. *A62C 37/46* (2013.01); *A62C 35/68* (2013.01)

(58) Field of Classification Search
CPC ...... A62C 35/68; A62C 37/46; A62C 99/0018
See application file for complete search history.

(56) References Cited

U.S. PATENT DOCUMENTS 2,023,569 A * 12/1935 Allen ................. A62C 99/0027 169/11
5,857,525 A * 1/1999 Okamoto ........... A62C 99/0018 169/11

(Continued)

FOREIGN PATENT DOCUMENTS

CN 201396239 Y 2/2010
CN 201705977 U 1/2011

(Continued)

OTHER PUBLICATIONS

International Preliminary Report on Patentability for International Application No. PCT/US2019/036303 dated Jan. 7, 2021.

(Continued)

*Primary Examiner* — Darren W Gorman
(74) *Attorney, Agent, or Firm* — Honigman LLP

(57) ABSTRACT

A selector valve for a fire suppression system includes a pneumatic fluid inlet connecting to an inlet of a first pressure solenoid and an inlet of a second pressure solenoid. An inlet of a first vent solenoid in the selector valve is connected to an outlet of the first pressure solenoid, and an inlet of a second vent solenoid in the selector valve is connected to an outlet of the second pressure solenoid. A first selector valve outlet is connected to the outlet of the first pressure solenoid and a second selector valve outlet connected to the outlet of the second pressure solenoid.

9 Claims, 5 Drawing Sheets

(56) References Cited

U.S. PATENT DOCUMENTS

| | | | | |
|---|---|---|---|---|
| 5,893,292 | A | 4/1999 | Lanting | |
| 5,904,669 | A | 5/1999 | Schildgen et al. | |
| 5,954,138 | A * | 9/1999 | Gabriel | A62C 35/68 137/72 |
| 6,053,472 | A | 4/2000 | DeLand | |
| 8,087,637 | B2 * | 1/2012 | Sun | A62C 99/0018 251/30.02 |
| 8,523,139 | B2 | 9/2013 | Sakamoto et al. | |
| 8,783,644 | B2 * | 7/2014 | Sun | A62C 35/68 251/44 |
| 8,813,859 | B2 * | 8/2014 | Schlatter | A62C 35/68 169/59 |
| 9,103,461 | B2 * | 8/2015 | Dahlgren | H01H 35/26 |
| 2020/0197735 | A1 * | 6/2020 | Li | A62C 37/46 |
| 2021/0069539 | A1 * | 3/2021 | Nötzel | A62C 37/46 |

FOREIGN PATENT DOCUMENTS

| | | | | |
|---|---|---|---|---|
| CN | 101550900 | B | 8/2011 | |
| CN | 202132581 | U | 2/2012 | |
| CN | 103388552 | B | 12/2015 | |
| CN | 105782549 | A | 7/2016 | |
| CN | 107131308 | A | 9/2017 | |
| CN | 107461511 | A | 12/2017 | |
| CN | 206860932 | U | 1/2018 | |
| DE | 4302334 | A1 * | 8/1994 | A62C 37/00 |
| EP | 0590529 | A | 4/1994 | |
| JP | H0515964 | U | 3/1993 | |
| JP | 2007078143 | A | 3/2007 | |
| JP | 4283364 | B2 * | 6/2009 | |

OTHER PUBLICATIONS

International Search Report and Written Opinion for International Patent Application No. PCT/US2019/036303 dated Sep. 12, 2019.

Trinkel, Bud, "Book 2, Chapter 8: Directional Control Valves", Sep. 23, 2008 (Sep. 23, 2008), XP055618247, www.hydraulicspneumatics.com, Retrieved from the Internet: URL:https://web.archive.org/web/20170614063338/http://www.hydraulicspneumatics.com:80/other-technologies/book-2-chapter-8-directional-control-valves, retrieved on Sep. 4, 2019.

Krivts, Igor Lazar et al: "Structure of Pneumatic Actuating Systems" In: "Structure of Pneumatic Actuating Systems", Jan. 1, 2006 (Jan. 1, 2006), CRC Press, Baton Rouge, XP055618709, ISBN: 978-0-8493-2964-7 vol. 18, pp. 1-19, DOI:10.1201/9781420004465.

* cited by examiner

REMOTE CONTROLLABLE SELECTOR VALVE CONFIGURATION

CROSS-REFERENCE TO RELATED APPLICATION

This application claims priority to U.S. Provisional Patent Application No. 62/689,320 filed on Jun. 25, 2018.

TECHNICAL FIELD

The present disclosure relates generally to selector valves for utilization in fire suppression systems, and more specifically to a remotely controllable selector valve.

BACKGROUND

Fire suppression systems, such as those utilized in building fire and security systems, suppress fires by replacing some, or all, of the oxygen within a confined space with an inert gas. In order to achieve this, the fire suppression system opens a valve connected to an inert gas source. Opening the valve in turn allows the inert gas to flow from the inert gas source into the confined space through the valve. Typically, the valve controller that controls the valve and the inert gas dispersal system are distinct subsystems and are designed independently of each other.

Existing systems for opening the valve typically utilize a selector valve where a single pneumatic solenoid is maintained in a closed state. When activation of the fire suppression system is required, the pneumatic solenoid opens and pressurized pneumatic fluid is provided to an input of a fire suppression system valve. The pressurized pneumatic fluid causes the fire suppression system valve to open and allows the inert gas to flow into the confined space. However, due to the back pressure present in such a system, the single pneumatic solenoid configuration is unable to be remotely reset. Instead, a technician must manually recharge and reset the activation solenoid before the fire suppression system can be returned to operation.

SUMMARY OF THE INVENTION

In one exemplary embodiment a selector valve for a fire suppression system includes a pneumatic fluid inlet connecting to an inlet of a first pressure solenoid and an inlet of a second pressure solenoid, an inlet of a first vent solenoid connected to an outlet of the first pressure solenoid, an inlet of a second vent solenoid connected to an outlet of the second pressure solenoid, and a first selector valve outlet connected to the outlet of the first pressure solenoid, and a second selector valve outlet connected to the outlet of the second pressure solenoid.

Another example of the above described selector valve for a fire suppression system further includes a controller communicatively coupled to each of the first pressure solenoid, the second pressure solenoid, the first vent solenoid, and the second vent solenoid.

In another example of any of the above described selector valves for a fire suppression system each of the first pressure solenoid, the second pressure solenoid, the first vent solenoid, and the second vent solenoid has an open state and a closed state, and wherein the state of each solenoid is controlled by the controller.

In another example of any of the above described selector valves for a fire suppression system at least one of the first pressure solenoid, the second pressure solenoid, the first vent solenoid, and the second vent solenoid includes an intermediate state, the intermediate state providing a metered flow through the solenoid.

In another example of any of the above described selector valves for a fire suppression system the controller further includes fire suppression valve monitor input configured to receive an input from a valve monitor in a fire suppression system.

In another example of any of the above described selector valves for a fire suppression system the fire suppression valve monitor input is a linear encoder monitor.

In another example of any of the above described selector valves for a fire suppression system the pneumatic fluid inlet is connected to a pressurized pneumatic fluid source.

In another example of any of the above described selector valves for a fire suppression system the first selector valve outlet is connected to a first pneumatically controlled valve inlet of a fire suppression system, and the second selector valve outlet is connected to a second pneumatically controlled valve inlet of the fire suppression system.

In one exemplary embodiment a fire suppression system includes a fire suppressant dispersion device including at least one pneumatically controlled valve, a fire suppressant inlet, and a fire suppressant outlet, a selector valve connecting a pneumatic fluid source to a first inlet of the pneumatically controlled valve and a second inlet of the at least one pneumatically controlled valve, and wherein the selector valve includes a pneumatic fluid inlet connecting an inlet of a first pressure solenoid and an inlet of a second pressure solenoid to the pneumatic fluid source, an inlet of a first vent solenoid connected to an outlet of the first pressure solenoid, an inlet of a second vent solenoid connected to an outlet of the second pressure solenoid, and a first selector valve outlet connecting the outlet of the first pressure solenoid to the first inlet of the pneumatically controlled valve, and a second selector valve outlet connecting the outlet of the second pressure solenoid to the second inlet of the pneumatically controlled valve.

In another example of the above described fire suppression system the fire suppressant is an inert gas.

Another example of any of the above described fire suppression systems further includes a linear encoder configured to monitor a position of the pneumatically controlled valve.

Another example of any of the above described fire suppression systems further includes a controller communicatively coupled to the selector valve and configured to control the selector valve at least partially in response to a measurement received from the linear encoder.

Another example of any of the above described fire suppression systems further includes a controller remote from the fire suppressant dispersion device and communicatively coupled to the fire suppressant dispersion device, the controller being configured to activate the fire suppressant dispersion device in response to detection of a fire, and being configured to reset the selector valve in response to detection of the fire ceasing.

In another example of any of the above described fire suppression systems wherein the controller is connected to the fire suppressant dispersion device via at least one of a hardwire connection and a local wireless connection.

In another example of any of the above described fire suppression systems the controller includes at least a first sub controller and a second sub controller, wherein the first sub controller is local to the fire suppressant dispersion device and the second sub controller is remote from the fire suppressant dispersion device.

In another example of any of the above described fire suppression systems each of the first pressure solenoid, the second pressure solenoid, the first vent solenoid, and the second vent solenoid has an open state and a closed state, and wherein the state of each solenoid is controlled by the controller.

In another example of any of the above described fire suppression systems at least one of the first pressure solenoid, the second pressure solenoid, the first vent solenoid, and the second vent solenoid includes an intermediate state, the intermediate state providing a metered flow through the solenoid.

An exemplary method for remotely resetting a selector valve for a fire suppression system includes opening a first pressure valve and a second vent valve and closing a second pressure valve and a first vent valve, thereby reversing a pressure imbalance at a pneumatically controlled valve of the fire suppression system.

In another example of the above described exemplary method for remotely resetting a selector valve for a fire suppression system opening the first pressure valve and the second vent valve occurs before closing the second pressure valve and the second vent valve.

In another example of any of the above described exemplary methods for remotely resetting a selector valve for a fire suppression system opening the first pressure valve and the second vent valve and closing the second pressure valve and the first vent valve occurs approximately simultaneously.

These and other features of the present invention can be best understood from the following specification and drawings, the following of which is a brief description.

DETAILED DESCRIPTION OF AN EMBODIMENT

Figure 1:
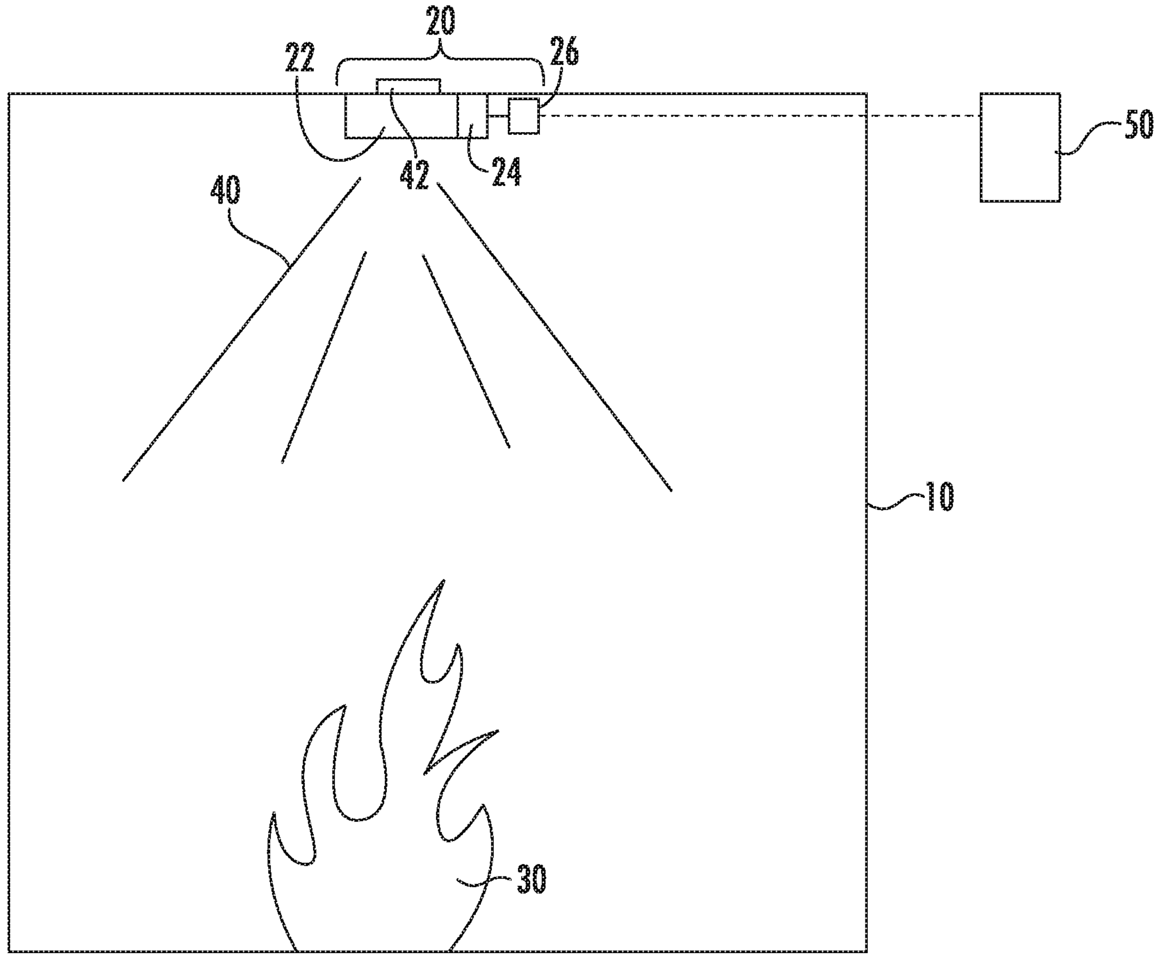
FIG. 1 schematically illustrates an exemplary confined space including a remotely controlled fire suppression system.

FIG. 1 schematically illustrates an exemplary confined space 10 including a remotely controlled fire suppression system 20. When a fire 30 is detected within the confined space 10, the fire suppression system 20 disperses an inert gas 40 from an inert gas source 42. The inert gas 40 displaces some, or all, of the oxygen within the confined space 10 causing the fire 30 to be suppressed. In some examples, the amount of inert gas 40 dispersed is calculated to be large enough to suppress the fire 30, but remain small enough that the environment within the confined space 10 is not hazardous to any individuals within the confined space 10.

The fire suppression system 20 includes an inert gas dispersion system 22, which is controlled by a valve 24. In some examples, the valve 24 is pneumatically controlled ball valve. In alternative examples, the valve 24 is a pneumatically controlled three way valve. Activation of the fire suppression system 20 is achieved when a controller 50 transmits an activation signal to a pneumatic fluid valve system 26. The pneumatic fluid valve system 26 adjusts the pneumatic pressure at the valve 24, causing the valve 24 to open or close, thereby allowing inert gas to be dispersed or the flow of inert gas 40 to be shut off.

The controller 50 can be remotely positioned at another site within the building housing the confined space 10, positioned within the confined space 10 and remote from the fire suppression system 20, or at a location remote from the confined space 10. In alternative examples, the controller 50 can be defined as a network of control systems including locally positioned controllers and remote controllers. Further, the controller 50 can be either directly connected to the fire suppression system 20 via a hardwired connection or a local wireless connection, or remotely positioned and connected to the fire suppression system 20 via a wireless networked connection. In any structure, the controller 50 can detect the fire 30 using any known fire detection system including, but not limited to, smoke detection, thermal imaging, heat sensors and the like.

Controller 50 may be connected to a fire detection system directly, or through another system such as a control panel or relay system. In some examples, where security is of substantial importance, the controller 50 is a networked controller, with remotely located sub controllers being configured to monitor the status of the fire suppression system 20, but being unable to directly control the fire suppression system 20. In such an example, locally positioned sub controllers are configured to both monitor and affect control of the fire suppression system 20. In this way, a compromise of the remote sub controller(s) will not allow the user to improperly or maliciously activate the fire suppression system 20.

Figure 2:
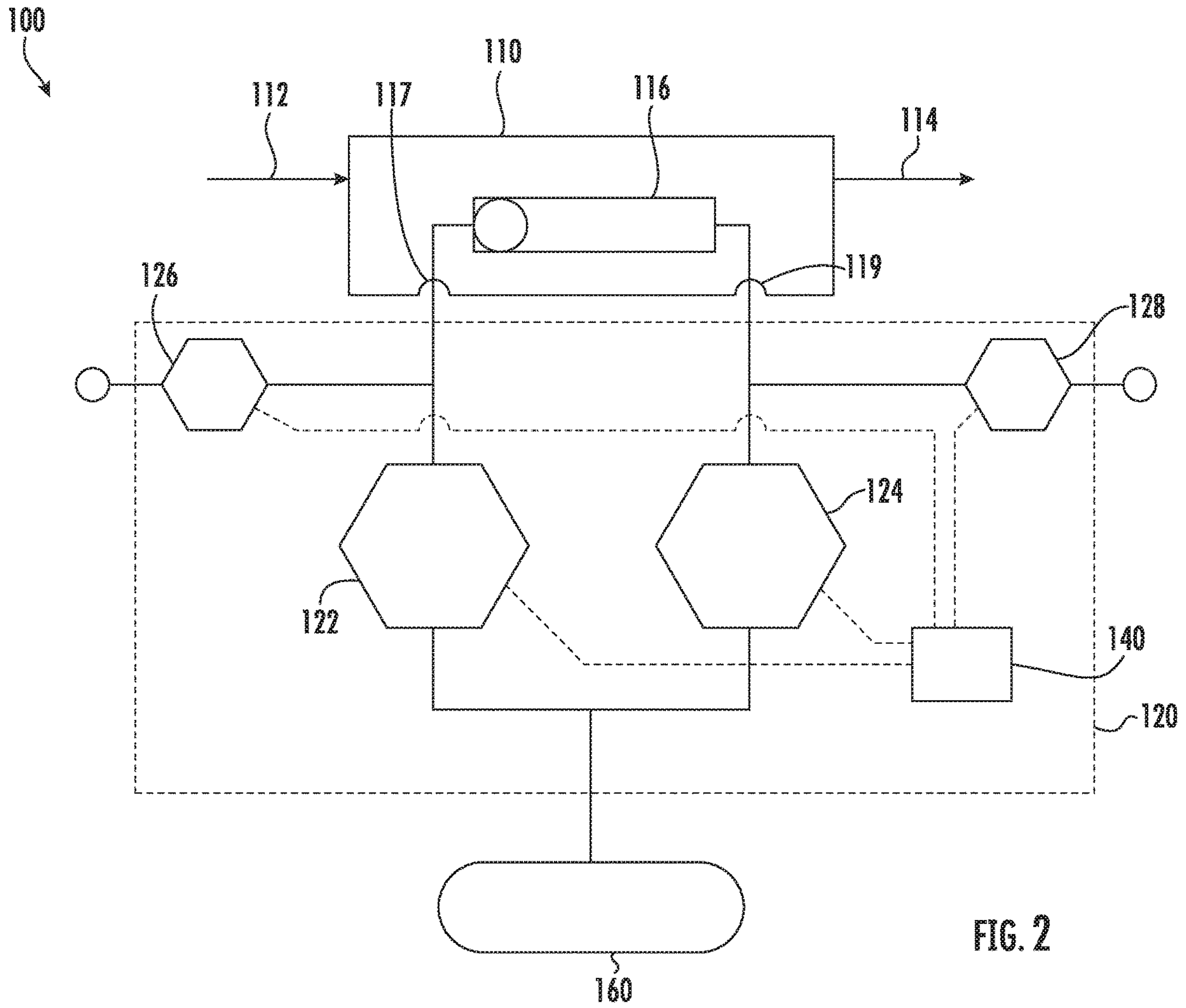
FIG. 2 schematically illustrates an exemplary remotely controlled fire suppression system.

With continued reference to FIG. 1, FIG. 2 schematically illustrates an alternate exemplary remotely controlled fire suppression system 100. The remotely controlled fire suppression system 100 includes an inert gas dispersion device 110 that is connected to an inert gas source at an input 112, and disperses the gas at an output 114. The dispersion of the gas is controlled via a pneumatically controlled valve 116 within the gas dispersion device 110. The pneumatically controlled valve 116 includes a first inlet 117 and a second inlet 119, each of which is connected to a pneumatic control valve system 120, referred to as a selector valve.

In existing systems, a single pneumatic control solenoid connects a pressurized pneumatic fluid source 160 to the pneumatic valve 116. When the pneumatic control solenoid is opened by a controller, pneumatic fluid is provided to the first inlet 117, which causes a pressure imbalance across the pneumatically controlled valve 116 and forces the pneumatic valve 116 to open. The second inlet 119 allows pneumatic fluid on the opposite side of the pneumatically controlled valve 116 to escape as the position of the pneumatically controlled valve 116 is shifted due to the pressure imbalance. In such a system however, there is no way to reset the fire suppression system, or to partially open the pneumatically controlled valve 116, and the fire suppression system must be manually reset after being activated.

In place of the singular control valve, the fire suppression systems described herein utilize a network of pneumatic control valves including at least a first pressure solenoid 122, a second pressure solenoid 124, a first vent solenoid 126 and a second vent solenoid 128 in the pneumatic control valve system 120. As used herein, a pneumatic control valve is a valve that at least partially controls a pneumatic valve. Each of the solenoids 122, 124, 126, 128 is controlled via a controller 140, and is connected to the controller 140 via a corresponding control connection. The controller 140 can be any control system, including those described above with regards to FIG. 1. The control connections can be any type of data connection configured to provide for the transfer of control signals from the controller 140 to a corresponding solenoid 122, 124, 126, 128.

In the default state, where the fire suppression system 100 is not actively dispersing an inert gas, the first pressure solenoid 122 and the second vent solenoid 128 are in a closed position and the first vent solenoid 126 and the second pressure solenoid 124 are in an open position. In this state, a maximum pneumatic pressure is provided at the second inlet 119 of the gas dispersion device 110, and a minimum pneumatic pressure is provided at the first inlet 117.

When gas dispersion is required, the controller 140 reverses the state of each of the valves 122, 124, 126, 128, resulting in the first pressure solenoid 122 and the second vent solenoid 128 being open, and the second pressure solenoid 124 and the first vent solenoid 126 being closed. Switching the solenoid states causes the maximum pneumatic pressure to be provided at the first inlet 117 of the pneumatically controlled valve 116 in the gas dispersion device, and the minimum pneumatic pressure to be provided at the second inlet of the pneumatically controlled valve 116 in the gas dispersion system 110. This inversion of the pressures at the inlet 117, 119 causes the pneumatically controlled valve 116 to switch states and allows the inert gas to pass through the gas dispersion device 110 and be dispersed into a confined space containing the fire suppression system 100.

By utilizing the pressure solenoids 122, 124 and the vent solenoids 126, 128 instead of a single valve as in existing systems, the backpressure can be relieved through the open vent solenoid 126, 128, and the controller 140 can, by reversing the pressure imbalance at the pneumatically controlled valve 116 of the fire suppression system, automatically and remotely reset the inert gas dispersion system 110 without requiring a user to manually reset the system. This in turn, allows for the system to be remotely controlled via the controller 50.

Figure 3:
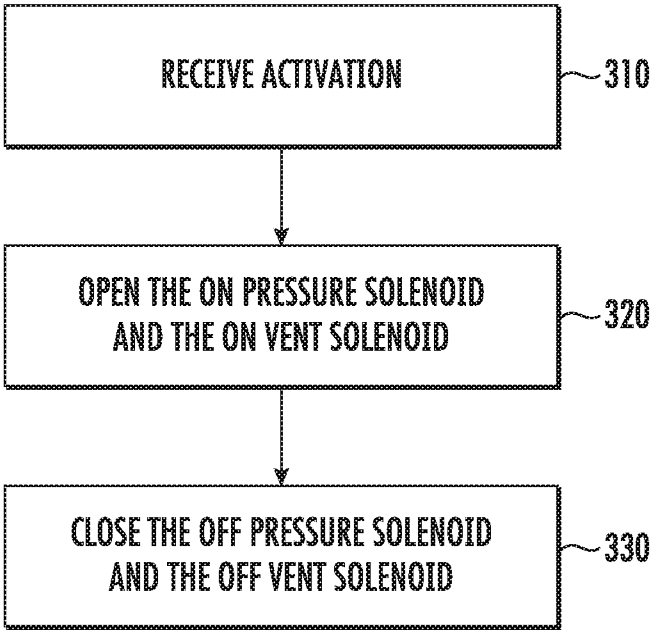
FIG. 3 illustrates a flow chart detailing the activation operations of the remotely controlled fire suppression valve of FIG. 2.

With continued reference to FIG. 2, FIG. 3 is a flowchart demonstrating the sequencing of a remote activation of the gas dispersion system 110. Initially, the pneumatic control valve system 120 receives an activation signal from the controller 140 in a "Receive Activation" step 310. In response to the receive activation step 310, the controller 140 opens the first pressure solenoid 122 and the second vent solenoid 128 in a "Open the On Pressure Solenoid and the On Vent Solenoid" step 320. The first pressure solenoid 122 is referred to as the "on pressure solenoid" and the second vent solenoid 128 is referred to as the "on vent solenoid" as they are placed in the open state in order to turn the system on. After placing the on pressure solenoid 122 and the on vent solenoid 128 into the open state, the controller 140 switches the second pressure solenoid 124 and the first vent solenoid 126 into the off (or closed) state in a "Close the Off Pressure Solenoid and the Off Vent Solenoid" step 330.

By sequencing the status change in the described manner, the pneumatically controlled valve 116 within the gas dispersion device can be safely switched to an on state. In order to reset the inert gas dispersion device, and cease dispersion of the inert gas, the controller 140 reverses the states of the pressure solenoids 122, 124 and vent solenoids 126, 128, and effectively inverts the method illustrated in FIG. 3.

Figure 5:
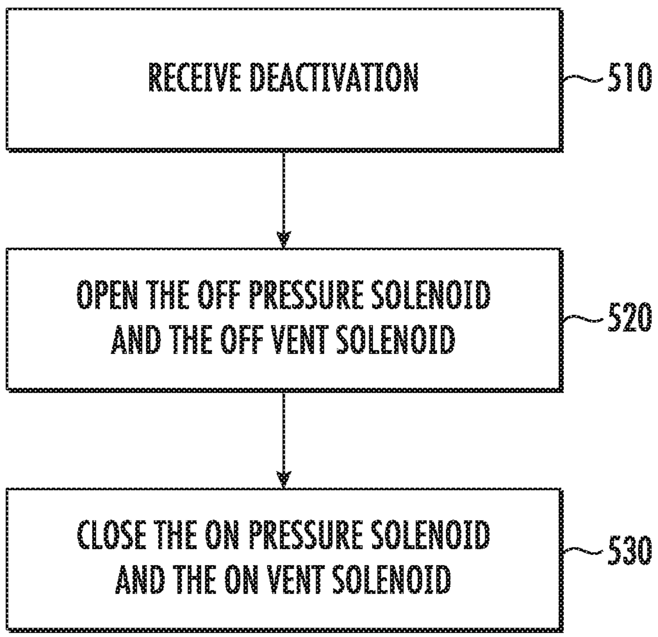
FIG. 5 illustrates a flow chart detailing the deactivation operations of the remotely controlled fire suppression valve of FIG. 2

FIG. 5 is a flowchart demonstrating the sequencing of a remote deactivation of the gas dispersion system 110. Initially, the pneumatic control valve system 120 receives a deactivation signal from the controller 140 in a "Receive Deactivation" step 510. In response to the receive deactivation step 510, the controller 140 opens the second pressure solenoid 124 and the first vent solenoid 126 in a "Open the Off Pressure Solenoid and the Off Vent Solenoid" step 520. After placing the off pressure solenoid 124 and the off vent solenoid 126 into the open state, the controller 140 switches the first pressure solenoid 122 and the second vent solenoid 128 into the off (or closed) state in a "Close the Off Pressure Solenoid and the Off Vent Solenoid" step 330.

The first pressure solenoid 122 is referred to as the "on pressure solenoid" and the second vent solenoid 128 is referred to as the "on vent solenoid" as they are placed in the open state in order to turn the system on. Similarly, the second pressure solenoid 124 is referred to as the "off pressure solenoid" and the first vent solenoid 126 is referred to as the "off vent solenoid" in order to turn the system off.

In alternative examples of either the process of FIG. 3 or the process of FIG. 5, the states of each of the solenoids 122, 124, 126, 128 can be switched approximately simultaneously, and achieve similar results.

Figure 4:
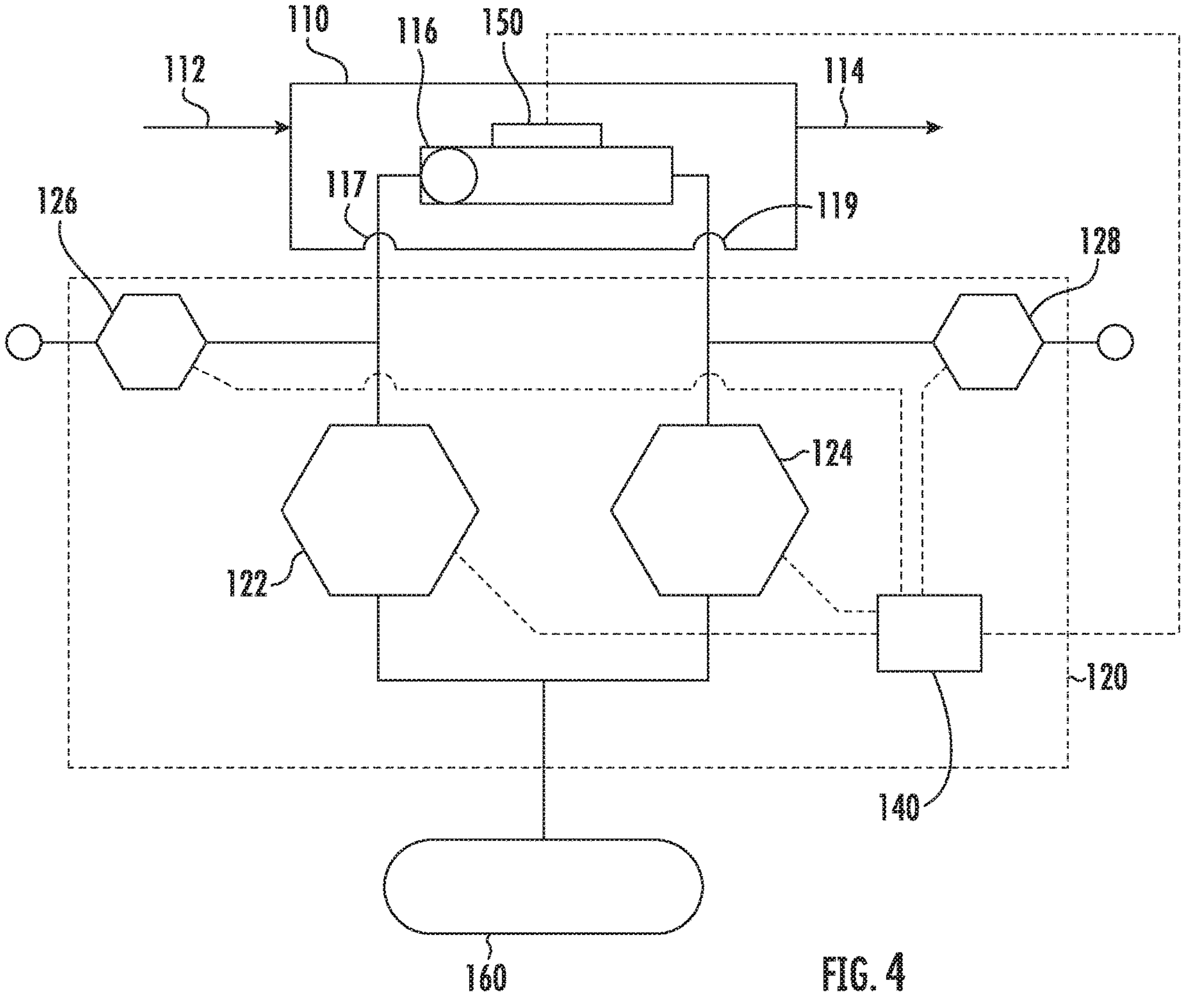
FIG. 4 schematically illustrates another exemplary remotely controlled fire suppression valve, with the inclusion of multiple additional features.

In the example of FIG. 2, and the method of FIG. 3, the pressure solenoids 122, 124 and the vent solenoids 126, 128 are on/off solenoids (i.e. solenoids with two possible states), and control the pneumatically controlled valve 116 within the inert gas dispersion device 110 into either a fully on or a fully off state. In some examples, however, it can be desirable to control the inert gas levels within the confined space 10 (illustrated in FIG. 1) during suppression of a fire. FIG. 4 schematically illustrates the system of FIG. 2 with the added inclusion of a valve monitor, such as a linear encoder 150. The linear encoder 150 monitors the position of the pneumatically controlled valve 116 within the inert gas dispersion device 110 and communicates the position with the controller 140 through a valve monitor input of the controller 140.

The inclusion of the linear encoder 150 allows the controller to adjust how open/closed each of the pressure solenoids 122, 124 and vent solenoids 126, 128 are, and thereby adjust how open/closed the pneumatically controlled valve 116 is. This, in turn, can control the volume of inert gas that can be passed through the inert gas dispersion system 110. By including intermediate states (e.g. states between fully open and fully closed) in each of the pressure solenoids 122, 124 and the vent solenoids 126, 128, the selector valve system can meter the pressure of pneumatic fluid at each side of the pneumatically controlled valve 116, and allow for finer control of the position of the pneumatically controlled valve 116. The metering in such an example is achieved by limiting the flow and pressure of pneumatic fluid to each side of the pneumatically controlled valve 116 via adjusting the positions of the pressure solenoids 122, 124 and the vent solenoids 126, 128 dependent on the output of the linear encoder 150.

With continued reference to all of FIGS. 1-4, the illustrated and described pneumatic control valve system 120 is configured to interconnect with the pressurized pneumatic fluid source 160 and the inert gas dispersion system 110 via the same inlet 117, 119 connections as existing single pneumatic control valve systems. The interconnection is achieved via a connection between an output of solenoid 122, an input of solenoid 126, and the inlet 117 of the pneumatically controlled valve, and by a connection between an output of solenoid 124, and input of solenoid 128 and the inlet 119 of the pneumatically controlled valve. By utilizing the same connections, the pneumatic control valve system 120 can be retrofit into, or included in existing fire suppression systems, allowing for the remote reset functionality to be included in existing systems that currently require a manual reset. In examples where the pneumatic control valve system 120 is being retrofit into an existing fire suppression system, the corresponding controller 140 will receive a software, or firmware, upgrade to allow for the additional control signals to be generated, and each of the solenoids 122, 124, 126, 128 is connected to a control output of the controller 140 via any conventional control signal connection. Once the installation has been completed, the system is controlled as discussed previously.

Further, while described above with regards to inert gas based fire suppression systems, it should be understood that the pneumatic control solenoid system 120 can be utilized to control any pneumatically controlled valve, including those in other types of fire suppression systems (e.g. chemical suppressant based systems) and other types of systems entirely.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fire suppression system comprising:

a fire suppressant dispersion device including at least one pneumatically controlled valve, a fire suppressant inlet, and a fire suppressant outlet;

a selector valve connecting a pneumatic fluid source to a first inlet of the at least one pneumatically controlled valve and a second inlet of the at least one pneumatically controlled valve; and wherein the selector valve includes a pneumatic fluid inlet connecting an inlet of a first pressure solenoid and an inlet of a second pressure solenoid to the pneumatic fluid source, an inlet of a first vent solenoid connected to an outlet of the first pressure solenoid, an inlet of a second vent solenoid connected to an outlet of the second pressure solenoid, and a first selector valve outlet connecting the outlet of the first pressure solenoid to the first inlet of the at least one pneumatically controlled valve, and a second selector valve outlet connecting the outlet of the second pressure solenoid to the second inlet of the at least one pneumatically controlled valve.

2. The fire suppression system of claim 1, wherein a fire suppressant of the fire suppressant dispersion device is an inert gas.

3. The fire suppression system of claim 1, further comprising a linear encoder configured to monitor a position of the at least one pneumatically controlled valve.

4. The fire suppression system of claim 3, further comprising a controller communicatively coupled to the selector valve and configured to control the selector valve at least partially in response to a measurement received from the linear encoder.

5. The fire suppression system of claim 1, further comprising a controller remote from the fire suppressant dispersion device and communicatively coupled to the fire suppressant dispersion device, the controller being configured to activate the fire suppressant dispersion device in response to detection of a fire, and being configured to reset the selector valve in response to detection of the fire ceasing.

6. The fire suppression system of claim 5, wherein the controller is connected to the fire suppressant dispersion device via at least one of a hardwire connection and a local wireless connection.

7. The fire suppression system of claim 5, wherein the controller includes at least a first sub controller and a second sub controller, wherein the first sub controller is local to the fire suppressant dispersion device and the second sub controller is remote from the fire suppressant dispersion device.

8. The fire suppression system of claim 5, wherein each of the first pressure solenoid, the second pressure solenoid, the first vent solenoid, and the second vent solenoid has an open state and a closed state, and wherein the open state and the closed state of each solenoid is controlled by the controller.

9. The fire suppression system of claim 8, wherein at least one of the first pressure solenoid, the second pressure solenoid, the first vent solenoid, and the second vent solenoid includes an intermediate state, the intermediate state providing a metered flow through the at least one of the first pressure solenoid, the second pressure solenoid, the first vent solenoid, and the second vent solenoid.

* * * * *